US011772074B2

United States Patent
Zhao et al.

(10) Patent No.: US 11,772,074 B2
(45) Date of Patent: Oct. 3, 2023

(54) METHOD FOR PRODUCTION OF VANADIUM CATALYSTS

(71) Applicant: BASF Corporation, Florham Park, NJ (US)

(72) Inventors: Feng Zhao, Shanghai (CN); Liang Chen, Shanghai (CN); Jia Di Zhang, Shanghai (CN); Feng Yang, Shanghai (CN)

(73) Assignee: BASF Corporation

( * ) Notice: Subject to any disclaimer, the term of this patent is extended or adjusted under 35 U.S.C. 154(b) by 168 days.

(21) Appl. No.: 17/309,526

(22) PCT Filed: Dec. 12, 2019

(86) PCT No.: PCT/CN2019/124867
§ 371 (c)(1),
(2) Date: Jun. 3, 2021

(87) PCT Pub. No.: WO2020/119763
PCT Pub. Date: Jun. 18, 2020

(65) Prior Publication Data
US 2022/0055018 A1    Feb. 24, 2022

(30) Foreign Application Priority Data
Dec. 14, 2018  (WO) ............... PCT/CN2018/121197

(51) Int. Cl.
| | | |
|---|---|---|
| *B01J 23/22* | (2006.01) | |
| *B01D 53/86* | (2006.01) | |
| *B01D 53/94* | (2006.01) | |
| *B01J 21/06* | (2006.01) | |
| *B01J 23/00* | (2006.01) | |
| *B01J 35/04* | (2006.01) | |
| *B01J 37/03* | (2006.01) | |
| *B01J 37/04* | (2006.01) | |
| *B01J 37/08* | (2006.01) | |
| *F01N 3/20* | (2006.01) | |
| *F01N 3/28* | (2006.01) | |

(52) U.S. Cl.
CPC .......... *B01J 23/22* (2013.01); *B01D 53/8628* (2013.01); *B01D 53/9418* (2013.01); *B01J 21/063* (2013.01); *B01J 23/002* (2013.01); *B01J 35/04* (2013.01); *B01J 37/038* (2013.01); *B01J 37/04* (2013.01); *B01J 37/082* (2013.01); *F01N 3/2066* (2013.01); *F01N 3/2828* (2013.01); *B01D 2255/2098* (2013.01); *B01D 2255/20723* (2013.01); *F01N 2330/06* (2013.01); *F01N 2370/02* (2013.01)

(58) Field of Classification Search
None
See application file for complete search history.

(56) References Cited

U.S. PATENT DOCUMENTS

| | | | |
|---|---|---|---|
| 3,279,884 A | 10/1966 | Nonnenmacher et al. | |
| 7,070,746 B1 * | 7/2006 | Notte ................. | B01D 53/8625 423/247 |
| 7,507,684 B2 | 3/2009 | Hofmann et al. | |
| 8,975,206 B2 | 3/2015 | Schermanz et al. | |
| 2009/0143225 A1 * | 6/2009 | Ha ........................... | B01J 23/22 502/247 |
| 2014/0157763 A1 | 6/2014 | Chandler et al. | |

FOREIGN PATENT DOCUMENTS

| | | | |
|---|---|---|---|
| CA | 2899929 A1 | | 2/2011 |
| CN | 101242897 A | | 8/2008 |
| CN | 102527371 | * | 7/2012 |
| CN | 102527371 A | | 7/2012 |
| CN | 103736497 A | | 4/2014 |
| CN | 108236961 A | | 7/2018 |
| CN | 108246282 A | | 7/2018 |
| EP | 0272620 A2 | | 6/1988 |
| EP | 0348768 A2 | | 1/1990 |
| EP | 2719454 | * | 11/2012 |
| GB | 1495396 | * | 12/1974 |
| KR | 101065242 B1 | | 9/2011 |
| WO | WO-2010/099395 A1 | | 9/2010 |
| WO | WO-2013/017873 A1 | | 2/2013 |
| WO | WO-2013/179129 A2 | | 12/2013 |
| WO | 2017101449 | * | 6/2017 |
| WO | WO 2017/101449 A1 | | 6/2017 |
| WO | WO 2018/018406 A1 | | 2/2018 |

OTHER PUBLICATIONS

International Serach Report dated Mar. 13, 2020, for International Application No. PCT/CN2019/124867.

* cited by examiner

*Primary Examiner* — Sheng H Davis
(74) *Attorney, Agent, or Firm* — Baltazar Gomez

(57) ABSTRACT

A method for production of vanadium catalysts, including steps of 1) providing a mixture comprising a TiO$_2$-based support and a composite oxide containing vanadium and antimony; 2) preparing a slurry containing the mixture obtained from step 1), and additive comprising at least one species selected from the group consisting of Si, Al, Zr, Ti, W and Mo, and a solvent; and 3) applying the slurry onto a substrate or processing the slurry into shaped bodies. The vanadium catalysts obtained/obtainable from the method, and use thereof for abatement of nitrogen oxides (NOx).

16 Claims, 3 Drawing Sheets

US 11,772,074 B2

METHOD FOR PRODUCTION OF VANADIUM CATALYSTS

This application is a U.S. national stage entry application under 35 U.S.C. § 371 from PCT International Application No. PCT/CN2019/124867, filed on Dec. 12, 2019, which claims priority to PCT International Application No. PCT/CN2018/121197, filed on Dec. 14, 2018; the contents of each application is incorporated herein by reference in its entirety.

FIELD OF THE INVENTION

Generally, the present invention relates to a method for production of antimony promoted vanadium catalysts. More particularly, the present invention relates to a method for production of antimony promoted vanadium catalysts for selective catalytic reduction (SCR), the antimony promoted vanadium catalysts obtained/obtainable from the method, and use of the catalysts for abatement of nitrogen oxides (NOx).

BACKGROUND

NOx emitted as exhaust gases from mobile source such as vehicles and stationary source such as power plants would be harmful to environment and human beings. In order to remove NOx from exhaust gases, catalytic reducing methods have heretofore been developed. The catalytic reducing methods are suitable for dealing with large quantities of exhaust gases, and of these, a process comprising adding ammonia as a reducing agent to catalytically reduce NOx selectively to $N_2$ was reported to be superior. Various catalysts useful for selective catalytic reduction, also called SCR catalysts, have been developed for abatement of NOx from the stationary and mobile sources.

Among various SCR catalysts, a group of catalysts with vanadium oxides as active species (V SCR catalysts) is of particular interest for their low cost and sulfur resistance during a NOx abatement process. Generally, V SCR catalysts comprise one or more promoters to provide improved catalyst performances. For example, V SCR catalysts containing an oxide of tungsten or molybdenum as a promoter have been widely studied for several decades, as described in U.S. Pat. No. 3,279,884A, EP0272620A2, EP0348768A2, CA2899929A, CN103736497A, U.S. Pat. No. 7,507,684B2, US2014/0157763A1, WO2010/099395A1, WO2013/179129A2, WO2013/017873A1.

Due to the needs of further reducing cost and improving catalyst performance for abatement of NOx, V SCR catalysts with alternative promoters were developed. One of the alternative promoters of interest is antimony. Such V SCR catalysts with antimony as a promoter were described, for example, in KR10106524261, US2009/143225A1, US897520662, and WO2017101449A1.

KR101065242B1 discloses a V SCR catalyst prepared by a process which comprises mixing a vanadium precursor and an antimony precursor into a slurry containing $TiO_2$ sol and calcining the obtained slurry. It was described that the V SCR catalyst with antimony as the promoter has good NOx abatement efficiency and poisoning resistance at low temperatures.

US2009/143225A1 discloses a V SCR catalyst comprising metal oxide supporters, vanadium as the active material and antimony as the promoter. The V SCR catalyst was prepared by impregnation $TiO_2$ with precursors containing vanadium and antimony or other conventional catalyst synthesis methods such as sol gel method. It was described that the V SCR catalyst can promote reduction of NOx at low temperatures and increase sulfur poisoning resistance.

U.S. Pat. No. 8,975,206B2 discloses a V SCR catalyst composition comprising a vanadate represented by $XVO_4/S$, in which $XVO_4$ stands for Bi-, Sb-, Ga- and/or Al-vanadate, and S is a support comprising $TiO_2$. Among others, $VSbO_4$ supported on $TiO_2/WO_3/SiO_2$ is given as an example, which is prepared by mixing V and Sb source solutions, drying and calcining to obtain $VSbO_4$ which is then supported on $TiO_2/WO_3/SiO_2$. It was described that the SCR catalyst has improved heat resistance compared with RE-vanadate prior art materials.

WO2017101449A1 discloses a SCR catalyst prepared from a process which comprises mixing a vanadium/antimony oxide and optionally a silicon source with a support comprising $TiO_2$ in a solvent to obtain a suspension, drying and calcining. The vanadium/antimony oxide was prepared by providing a suspension comprising vanadium oxide(s) and antimony oxide(s), and drying.

SUMMARY OF THE INVENTION

SCR catalysts were generally applied onto a substrate such as flow-through or wall-flow substrate or extruded into a shape body for NOx abatement applications. In commercial scale manufacture processes, the production of the SCR catalysts generally includes preparing a slurry comprising an active component or a precursor thereof, a promoter or a precursor thereof, and a support or a precursor thereof, coating the slurry onto a substrate or extruding, and then heat treatment such as drying and calcination. The operations such as slurry preparing, coating or extruding need to be carried out in an open environment since it is not possible in practice that those operations are carried out in facilities under protection or in a closed environment. There will be a severe problem if a material being toxic or having potential toxicity evolves in such operations.

For the production of V SCR catalysts with an antimony promoter, various antimony precursors such as $Sb_2O_3$, $SbCl_3$, $Sb(CH_3COO)_3$, $Sb_2(SO_4)_3$ may be used, among which $Sb_2O_3$ is the most preferred for its stability under normal storage conditions, lower toxicity and less corrosive properties to production facilities. However, $Sb_2O_3$ can easily become more dangerous by forming dust in air and being volatile at a temperature above 450° C. and thus cause severe environment, health and safety (EHS) risks. It can be understood that the EHS risks will arise if the V SCR catalysts with an antimony promoter were prepared in accordance with the processes as described in KR101065242B1 and US2009/143225A1.

The processes for production of the V SCR catalysts with an antimony promoter as described in U.S. Pat. No. 8,975,206B2 and WO2017101449A1 include preparation of $VSbO_4$ or a vanadium/antimony oxide, mixing into a slurry containing a support, followed by heat treatments or by coating and heat treatments. Intentional use of $Sb_2O_3$ in the slurry preparation and presence thereof during operations such as coating, and then heat treatments may be avoided in those processes. However, the pre-formation of $VSbO_4$ or vanadium/antimony oxide will lead to unsatisfactory NOx conversion performance of the fresh SCR catalysts obtained by such processes.

Thus, the object of the present invention is to provide a method for production of antimony promoted vanadium catalysts, which will not result in EHS risks during production, preferably have a desirable NOx abatement performance.

The inventors found that the object of the present invention can be achieved by a method for production of antimony promoted vanadium catalysts, which includes a separate process for forming a mixture comprising a $TiO_2$-based support and a composite oxide containing vanadium and antimony. Particularly, the present application relates to following embodiments.

Embodiment 1

A method for production of antimony promoted vanadium catalysts, including steps of
1) providing a mixture comprising a $TiO_2$-based support and a composite oxide containing vanadium and antimony;
2) preparing a slurry containing the mixture obtained from step 1), an additive comprising at least one species selected from the group consisting of Si, Al, Zr, Ti, W and Mo, and a solvent; and
3) applying the slurry onto a substrate or processing the slurry into shaped bodies.

Embodiment 2

The method according to embodiment 1, wherein in step 1), the mixture comprising a $TiO_2$-based support and a composite oxide containing vanadium and antimony may be provided by a process including sub-steps of
1.1) preparing a mixture comprising or consisting of a vanadium precursor, an antimony precursor and a $TiO_2$-based support or a precursor thereof, optionally with a solvent;
1.2) drying the mixture at a temperature in the range of 80 to 250° C.; and
1.3) calcining at a temperature in the range of 300° C. to 700° C. in an oxygen-containing atmosphere to obtain a mixture comprising a $TiO_2$-based support and a composite oxide containing vanadium and antimony.

Embodiment 3

The method according to embodiment 2, wherein the mixture as prepared in sub-step 1.1) is a wet mixture, which is preferably prepared by incipient wetness impregnation.

Embodiment 4

The method according to embodiment 3, wherein the wet mixture was provided by adding a solution of vanadium precursor in the solvent to a mixture of $TiO_2$-based support and $Sb_2O_3$ via incipient wetness impregnation.

Embodiment 5

The method according to any of embodiments 2 to 4, wherein the drying in sub-step 1.2) is conducted at a temperature in the range of 100° C. to 250° C., more preferably 110° C. to 180° C.

Embodiment 6

The method according to any of embodiments 2 to 5, wherein the calcining in sub-step 1.3) is conducted at a temperature of in the range of 350 to 700° C., preferably 400° C. to 650° C., more preferably 450° C. to 600° C.

Embodiment 7

The method according to any of embodiments 1 to 6, wherein the $TiO_2$-based support consists of $TiO_2$, particularly $TiO_2$ in form of anatase.

Embodiment 8

The method according to any of embodiments 1 to 7, wherein the additive is at least one selected from the group consisting of $SiO_2$, $ZrO_2$, $Al_2O_3$, $TiO_2$, $WO_3$ and $MoO_3$ and any precursors thereof, preferably the additive being $SiO_2$ or a precursor thereof, or a combination of $SiO_2$ or a precursor thereof with any one or more of $ZrO_2$, $Al_2O_3$, $TiO_2$, $WO_3$ and $MoO_3$ or any precursors thereof.

Embodiment 9

The method according to any of embodiments 1 to 8, wherein step 1 is carried out such that no substance with EHS risks is released into air directly.

Embodiment 10

The method according to any of embodiments 1 to 9, further including, after step 3),
4) drying at a temperature in the range of −20° C. to 300° C.; and
5) calcining at a temperature of at least 350° C.

Embodiment 11

The method according to embodiment 10, wherein the drying in step 4) is conducted at a temperature in the range of 20° C. to 250° C., more preferably 20° C. to 200° C.

Embodiment 12

The method according to embodiment 10 or 11, wherein the calcining in step 5) is conducted at a temperature in the range of 350° C. to 700° C., preferably 400° C. to 700° C., particularly 450° C. to 700° C., more preferably 450° C. to 600° C.

Embodiment 13

The method according to any of embodiments 1 to 12, wherein, in step 3), the slurry is applied onto a substrate having a honeycomb structure, particularly a ceramic honeycomb substrate, or shaped into a honeycomb body by extrusion.

Embodiment 14

Antimony promoted vanadium catalysts obtained/obtainable by the method according to any of embodiments 1 to 13.

Embodiment 15

Use of the antimony promoted vanadium catalysts obtained/obtainable by the method according to any of embodiments 1 to 13 for selective catalytic reduction of nitrogen oxides.

Embodiment 16

Use according to embodiment 15, wherein the nitrogen oxides are present in exhaust gases from an internal combustion engine such as diesel engine, a power plant or an incinerator.

Embodiment 17

A method for selective catalytic reduction of nitrogen oxides present in exhaust gases from an internal combustion engine such as diesel engine, a power plant or an incinerator, comprising contacting the exhaust gases with the antimony promoted vanadium catalysts according to embodiment 14.

DETAILED DESCRIPTION OF THE INVENTION

Figure 1:
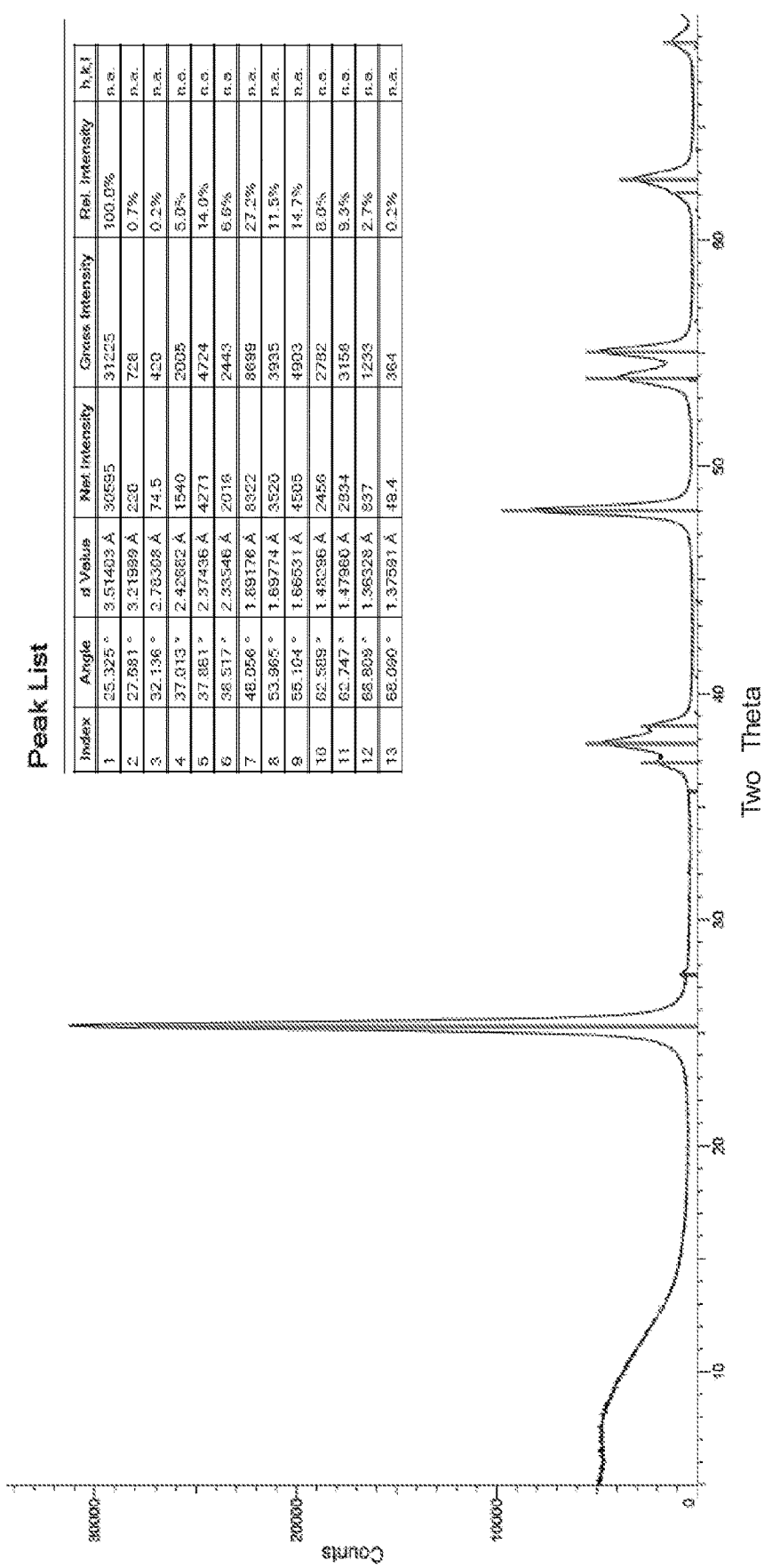
FIG. 1 shows an XRD pattern of the intermediate as prepared in phase 1) of Example 2 according to the present invention.

The present invention now will be described in details hereinafter. It is to be understood that the present invention may be embodied in many different ways and shall not be construed as limited to the embodiments set forth herein. Unless mentioned otherwise, all technical and scientific terms used herein have the same meaning as commonly understood by one of ordinary skill in the art to which this invention belongs. As used in this specification and the claims, the singular forms "a", "an", and "the" include plural referents unless the context clearly dictates otherwise.

<Method for Preparing the Antimony Promoted Vanadium Catalysts>

The present invention provides a method for production of antimony promoted vanadium catalysts, including steps of 1) providing a mixture comprising a $TiO_2$-based support and a composite oxide containing vanadium and antimony;

2) preparing a slurry containing the mixture obtained from step 1), an additive comprising at least one species selected from the group consisting of Si, Al, Zr, Ti, W and Mo, and a solvent; and 3) applying the slurry onto a substrate or processing the slurry into shaped bodies.

In a preferable embodiment according to the present invention, in step 1), the mixture comprising a $TiO_2$-based support and a composite oxide containing vanadium and antimony may be provided by a process including sub-steps of 1.1) preparing a mixture comprising or consisting of a vanadium precursor, an antimony precursor and a $TiO_2$-based support or a precursor thereof, optionally with a solvent;

1.2) drying the mixture at a temperature in the range of 80 to 250° C.; and 1.3) calcining at a temperature in the range of 300° C. to 700° C. in an oxygen-containing atmosphere to obtain a mixture comprising a $TiO_2$-based support and a composite oxide containing vanadium and antimony.

Accordingly, in a preferably embodiment, the present invention provides a method for production of antimony promoted vanadium catalysts, including steps of 1) providing a mixture comprising a $TiO_2$-based support and a composite oxide containing vanadium and antimony by a process including sub-steps of 1.1) preparing a mixture comprising or consisting of a vanadium precursor, an antimony precursor and a $TiO_2$-based support or a precursor thereof, optionally with a solvent;

1.2) drying the mixture at a temperature in the range of 80 to 250° C.;

1.3) calcining at a temperature in the range of 300° C. to 700° C. in an oxygen-containing atmosphere to obtain a mixture comprising a $TiO_2$-based support and a composite oxide containing vanadium and antimony;

2) preparing a slurry containing the mixture obtained from step 1), an additive comprising at least one species selected from the group consisting of Si, Al, Zr, Ti, W and Mo, and a solvent; and 3) applying the slurry onto a substrate or processing the slurry into shaped bodies.

In the context of the invention, the $TiO_2$-based support is intended to mean any supports comprising $TiO_2$. Preferably, the support consists of $TiO_2$, of $TiO_2$ and $SiO_2$, of $TiO_2$ and $WO_3$, of $TiO_2$, $SiO_2$ and $WO_3$, of $TiO_2$ and $Al_2O_3$ or of $TiO_2$ and $ZrO_2$. More preferably, the support consists of $TiO_2$. $TiO_2$ to be used in the present invention may be commercially available or prepared via conventional methods known in the art. Preferably, $TiO_2$ to be used as the support in the present invention is in form of anatase.

In the context of the invention, the vanadium precursor and antimony precursor are intended to mean compounds containing vanadium and compounds containing antimony respectively, which may be converted to the composite oxide containing vanadium and antimony in the method according to the present invention.

Preferably, the vanadium precursor is selected from the group consisting of ammonium vanadate, vanadium oxalate, vanadyl oxalate, vanadium pentoxide, vanadium monoethanolamine, vanadium chloride, vanadium trichloride oxide, vanadyl sulfate, vanadium sulfate, vanadium antimonite, vanadium antimonate and vanadium oxides.

Preferably, the antimony precursor is selected from the group consisting of antimony acetate, ethylene glycol antimony (antimony ethylene glycoxide), antimony sulfate, antimony nitrate, antimony chloride, antimonous sulfide, antimony oxides (e.g. $Sb_2O_3$) and antimony vanadate. More preferably, $Sb_2O_3$ is used as the antimony precursor.

In sub-step 1.1) of the method according to the present invention, the mixture, which may be dry or wet, may be prepared in various ways known in the art, depending on the precursors to be used in this step. For example, the wet mixture may be prepared by incipient wetness impregnation techniques, also called capillary impregnation or dry impregnation. In a particular embodiment, the wet mixture is prepared by a method comprising preparation of a mixture of $TiO_2$-based support and $Sb_2O_3$ and then incorporating a solution of vanadium precursor via incipient wetness impregnation.

In sub-step 1.2) of the method according to the present invention, the drying is preferably conducted at a temperature in the range of 100° C. to 250° C., more preferably 110° C. to 180° C. The drying can be conducted in any ways known in the art without particular limitations.

In sub-step 1.3) of the method according to the present invention, the calcining is preferably conducted at a temperature in the range of 350 to 700° C., preferably 400° C. to 650° C., more preferably 450° C. to 600° C. Generally, the calcining is conducted for a period from 30 minutes to 50 hours, preferably 1 to 10 hours and most preferably 1 to 5 hours.

There is no particular limitation for the oxygen-containing atmosphere to be applied in step 1.3), which may be air or a mixture of oxygen of an inert gas such as nitrogen.

In certain embodiments, a mixture comprising a $TiO_2$-based support and a composite oxide containing vanadium, antimony and titanium may be obtained in sub-step 1.3). Preferably, the composite oxide containing vanadium and antimony is a composite oxide of vanadium, antimony and titanium.

Without being bound by any theories, it is believed that the formation of the composite oxide containing vanadium, antimony and titanium is favored at relatively higher calcination temperature and/or longer calcinations duration.

Preferably, step 1), including sub-steps 1.1), 1.2) and 1.3), of the method according to the present invention is carried out such that no substance with EHS risks is released into air directly, for example under protection measures for preventing such substances from releasing into air directly.

In step 2) of the method according to the present invention, the slurry may be prepared in any ways known in the art without particular limitations. For example, the slurry may be prepared by a method which comprises preparing a suspension of the mixture comprising a $TiO_2$-based support and a composite oxide containing vanadium and antimony in the solvent, optionally adjusting pH in the range of 6 to 7, incorporating the additive into the suspension. It is to be understood that any conventional auxiliaries such as pH adjustors, binders, organic surfactants and/or thickener may be used, when necessary, in the preparation of the slurry for improving suspension properties favorable in subsequent steps. The additive may be any materials that could incorporate the species such as Si, Al, Zr, Ti, W and/or Mo into the catalyst to be produced. The additive may be for example natural or synthetic oxides, nitrides, carbides, borides, intermetallics, or salts of the species selected from the group consisting of Si, Al, Zr, Ti, W and Mo. Particularly, the additive may be selected from the group consisting of alumina, doped alumina, aluminum diboride, silica, silicon carbide, aluminosilicate, titania, tungsten oxides, molybdenum oxides, tungsten doped titania, molybdenum doped titania, zirconia, titania-zirconia, any precursors and any mixtures thereof. Natural minerals such as cordierite and spinel may also be used as the additive.

Particularly, the additive is at least one selected from the group consisting of $SiO_2$, $ZrO_2$, $Al_2O_3$, $TiO_2$, $WO_3$ and $MoO_3$ and any precursors thereof. Preferably, the additive is $SiO_2$ or a precursor thereof, or a combination of $SiO_2$ or a precursor thereof with any one or more of $ZrO_2$, $Al_2O_3$, $TiO_2$, $WO_3$ and $MoO_3$ or any precursors thereof. The precursors, when mentioned, refer to any substances which can provide the desired species. For example, the precursor of $SiO_2$ may be silica sol, silicic acid, silicates such as sodium silicate, alkoxysilanes, etc. or a combination of any two or more thereof. When used as the additive, $SiO_2$ may be in any form known in the art, for example but not being limited to quartz, fused or amorphous silica.

In the method according to the present invention, the solvent optionally used in step (1) and used in step (2), independently of each other, may be any suitable solvents known in the art, preferably an aqueous solvent, particularly water, more preferably deionized water.

In the method according to the present invention, amounts of the vanadium precursor, the antimony precursor, the $TiO_2$-based support or the precursor thereof used in step 1), and of the additive used in step 2) may be varied depending on the particular species to be used in those steps, with the provision that those amounts may provide a catalyst having a composition that is desirable for the NOx abatement performance. The desirable composition of such antimony promoted vanadium catalysts may be known in the art, for example, from WO2017101449A1.

Unless mentioned otherwise in the context, the amounts of vanadium, antimony, the support and the additive in each case are expressed as respective oxides, i.e. $V_2O_5$, $Sb_2O_3$, $TiO_2$ and any oxides of other support species (if present), and oxides of the species to be incorporated by the additive. Any percentage amounts of those components are calculated relative to the sum of the amounts of vanadium, antimony, the support and the additive. In the context of the present invention, the sum of all components expressed as respective oxides was also called "catalyst composition".

The amount of vanadium, expressed as $V_2O_5$, is generally in the range of 0.5 to 20 wt %, preferably 1 to 10 wt %, more preferably 2 to 8 wt %. The amount of antimony, expressed as $Sb_2O_3$, is generally in the range of 0.5 to 30 wt %, preferably in the range of 1 to 20 wt %, particularly 1.5 to 15 wt %, and more preferably 3 to 13 wt %. It is preferable that vanadium and antimony are present in a molar ratio V/Sb in the range of 10:1 to 1:10, Particularly 5:1 to 1:5, and more preferably 3:1 to 1:3, expressed as respective elements.

The amount of the additive depends on the form of the finished catalysts. The amount of the additive, expressed as the oxides of respective species to be incorporated into the catalyst in total, is generally in the range of 1 to 30 wt %, preferably 1 to 15 wt % in the case that the finished catalysts are in form of coated substrate which will be described hereinbelow, and is generally in the range of 1 to 90 wt % preferably 5 to 60 wt %, more preferably 10 to 50 wt % in the case that the finished catalysts are in form of shaped bodies. Respective amount of each additive, if more than one additive is used, is not critical for the purpose of the present invention.

In particular embodiments wherein $SiO_2$ was used as an additive and the finished catalysts are in form of coated substrate, the amount of $SiO_2$ is generally in the range of 0.4 to 18 wt %, preferably 0.8 to 15 wt %, more preferably 2 to 10 wt %.

The $TiO_2$-based support accounts for the balance of the catalyst composition. Generally, the amount of the $TiO_2$-based support, expressed as $TiO_2$ together with other oxides as mentioned above (if present), is in the range of 20 to 97.5 wt %, particularly 40 to 95 wt %, and more preferably 50 to 90 wt %.

In step 3) of the method according to the present invention, the slurry may be applied onto an inert substrate by any methods known in the art, for example by washcoating. It is to be understood that the substrate thus coated with the slurry will be dried and calcined so as to be ready for service. The obtained catalyst in form of coated substrate can have advantages of both excellent physical strength and low back pressure.

The substrate is not particularly limited, and for example, a flow-through substrate or a wall-flow substrate. The substrate may be any of those materials typically used for preparing such catalysts, such as ceramic or metal, and will preferably have a ceramic honeycomb structure. Any suitable substrates may be employed, such as a monolithic substrate of the type having fine, parallel gas flow passages extending therethrough from an inlet or an outlet face of the substrate, such that passages are open to fluid flow therethrough (i.e., flow-through substrates). The passages, which are essentially straight paths from their fluid inlet to their fluid outlet, are defined by walls on which the catalytic material is applied as a washcoat so that the gases flowing through the passages contact the catalytic material. The flow passages of the monolithic substrate are thin-walled channels, which can be of any suitable cross-sectional shape and size, such as trapezoidal, rectangular, square, sinusoidal, hexagonal, oval, circular, etc.

Such monolithic substrates may contain up to about 900 or more flow passages (or "cells") per square inch of cross section, although far fewer may be used. For example, the substrates may have about 50 to 600, more usually about 200 to 400, cells per square inch ("cpsi").

The load of the catalyst composition on the substrate is generally in the range of 0.5 to 10 g/in$^3$, preferably 1 to 7 g/in$^3$, and more preferably 2 to 5.5 g/in$^3$.

Alternatively, in step 3) of the method according to the present invention, the slurry may be shaped into beads, spheres, pellets, or honeycomb bodies and the like, according to various techniques known in the art. Any conventional auxiliaries may be incorporated during the shaping process as desired, such as binders, fillers and/or plasticizers. It is to be understood that the shaped bodies will be dried and calcined so as to be ready for service.

In a particularly embodiment, the slurry is shaped into a honeycomb body by extrusion, dried and calcined to provide the finished catalysts in form of extruded honeycomb bodies. Such catalysts in form of extruded honeycomb bodies contain the catalytic material itself as the skeleton without an additional inert substrate. By dispensing the use of inert substrate, significantly more amount of catalytic material per volume of the catalyst body is available and thus better NOx abatement performance may be provided especially at low temperatures, compared with the finished catalysts in form of coated substrate.

In a particular embodiment, the method according to the present invention further includes, after step 3), 4) drying at a temperature in the range of −20° C. to 300° C.;

5) calcining at a temperature of at least 350° C.

In step 4) of the method according to the present invention, the drying is preferably conducted at a temperature in the range from 20° C. to 250° C., more preferably 20° C. to 200° C. The drying can be conducted in any ways known in the art without particular limitations.

In step 5) of the method according to the present invention, the calcining is preferably conducted at a temperature in the range of 350° C. to 700° C., preferably in the range of 400° C. to 700° C., particularly 450° C. to 700° C., more preferably 450° C. to 600° C.

Generally, the calcining in step 5) is generally conducted for a period of no more than 5 hours, particularly no more than 3 hours, for example 2 hours in the case that the finished catalysts are in form of coated substrate, and for a period of no more than 20 hours, particularly no more than 10 hours, for example 5 hours in the case that the finished catalysts are in a form of shaped bodies.

<Antimony Promoted Vanadium Catalyst>

In a further aspect, the present invention provides antimony promoted vanadium catalysts obtained/obtainable by the method according to the present invention as described hereinabove.

<Method for Selective Catalytic Reduction of Nitrogen Oxides (NOx)>

In a further aspect, the present invention relates to use of the antimony promoted vanadium catalysts obtained/obtainable by the method according to the present invention for selective catalytic reduction of NOx, especially in exhaust gases.

The exhaust gases which can be treated by the antimony promoted vanadium catalysts obtained/obtainable by the method according to the present invention are any exhaust gases containing NOx to be removed or reduced. The exhaust gases are from for example, but not limited to an internal combustion engine such as diesel engine, a power plant or an incinerator.

Accordingly, a method for reducing NOx in exhaust gas from an internal combustion engine is provided, which comprises contacting the exhaust gas with the antimony promoted vanadium catalysts obtained/obtainable by the method according to the present invention.

In a particular embodiment, the exhaust gases are contacted with the antimony promoted vanadium catalysts obtained/obtainable by the method according to the present invention at a temperature in the range of 150° C. to 650° C., or 180 to 600° C., or 200 to 550° C.

The contact of the exhaust gases with the antimony promoted vanadium catalysts obtained/obtainable by the method according to the present invention is conducted in the presence of a reductant. The reductant that can be used in the present invention may be any reductants known in the art per se for reducing NOx, for example $NH_3$. $NH_3$ may be derived from urea.

The invention will be further illustrated by following Examples, which set forth particularly advantageous embodiments. While the Examples are provided to illustrate the present invention, they are not intended to limit it.

EXAMPLES

All experiments as described hereinafter were performed at a temperature of 20° C., unless otherwise specified.

Example 1 (Comparative)

82.64 g anatase $TiO_2$ powder as the support, 40 g solution of vanadyl oxalate in DI water having a vanadium content corresponding to 4 g $V_2O_5$, and 6.4 g $Sb_2O_3$ powder were mixed in 100 g DI water and stirred for 30 minutes to obtain a suspension. Under stirring, 18.6 g 30% aqueous ammonia was added to the suspension to obtain a pH of 7.0, and then 23.2 g $SiO_2$ sol in DI water having 30% $SiO_2$ content was added. After stirring for 20 minutes, a homogeneous slurry comprising 4% $V_2O_5$, 6.4% $Sb_2O_3$, 7.0% $SiO_2$ and 82.6% $TiO_2$ based on the sum of those oxides was obtained. Then, a cordierite honeycomb substrate of 350 cpsi, having a wall thickness of 5 mils, with diameter of 1 inch and length of 4 inches was dipped into the obtained slurry to load enough slurry. Extra loaded slurry was blown off with an air knife carefully, followed by drying with hot air at 150° C. for 10 minutes and then calcining at 450° C. in air for 3 hours. The process of washcoating, drying and calcination was repeated to load 4.5 g/in$^3$ dry washcoat on the substrate in total.

Example 2 (Inventive)

Phase 1)

Into a one liter autoclave equipped with a stirrer, 82.64 g anatase $TiO_2$ support, 6.4 g $Sb_2O_3$ were added and mixed under stirring for 2 hours to form a mixed powder. Into this dry powder, 40 g solution of vanadyl oxalate solution in DI water having a vanadium content corresponding to 4 g $V_2O_5$ was added via a nozzle into the mixed powder of $TiO_2$ and $Sb_2O_3$ in accordance with the incipient wetness impregnation. After stirring for another 2 hours, this wet mixed powder was released and transferred into in a rotary drier with a ventilator and a dust collector and dried at 120° C. for 4 hours to form a dry powder. This dry powder was then moved into a calciner with a ventilator and a dust collector, and calcined at 550° C. for 2 hours to obtain 93.04 g dry powder.

Phase 2)

Into the 93.04 g dry powder as prepared in phase 1), 115 g DI water was added and stirred for 1 hour to obtain a suspension. Under stirring, 18.6 g 30% aqueous ammonia was added to the suspension to obtain a pH of 7.0, and then 23.2 g $SiO_2$ sol in DI water having 30% $SiO_2$ content was added. After stirring for 1 hour, a homogeneous slurry was obtained. Then, a cordierite honeycomb substrate of 350 cpsi, having a wall thickness of 5 mils, with diameter of 1 inch and length of 4 inches was dipped into the obtained slurry to load enough slurry. Extra loaded slurry was blown off with an air knife carefully, followed by drying with hot air at 150° C. for 10 minutes, and then calcining at 450° C. in air for 3 hours. The process of washcoating, drying and calcination was repeated to load 4.5 g/in³ dry washcoat on the substrate in total.

Example 3 (Comparative)

Phase 1

40.0 g yellow $V_2O_5$ powder and 64 g white $Sb_2O_3$ powder were mixed in 300 g DI water, and stirred for 40 hours at 90° C. to form a suspension, which was then spray-dried at 200° C. to obtain a black powder. The black color of the spray-dried powder indicates formation of substance different from $V_2O_5$ and $Sb_2O_3$.

Phase 2)

Into 115 g DI water, 10.4 g black powder as prepared in phase 1) and 82.64 g $TiO_2$ powder were added successively and then homogenized via a homogenizer for 2 hours to obtain a suspension. Under stirring, 18.6 g 30% aqueous ammonia was added to the suspension to obtain a pH of 7.0, and then 23.2 g $SiO_2$ sol in DI water having 30% $SiO_2$ content was added. After stirring for 1 hour, a homogeneous slurry was obtained. Then, a cordierite honeycomb substrate of 350 cpsi, having a wall thickness of 5 mils, with diameter of 1 inch and length of 4 inches was dipped into the obtained slurry to load enough slurry. Extra loaded slurry was blown off with an air knife carefully, followed by drying with hot air at 150° C. for 10 minutes, and then calcining at 450° C. in air for 3 hours. The process of washcoating, drying and calcination was repeated to load 4.5 g/in³ dry washcoat on the substrate in total.

XRD Characterisation

The XRD analysis herein refers to X-ray diffraction with Cu Kα radiation, step size 0.02°, D8 Advance Series II, Bruker AXS GmbH, unless mentioned otherwise.

The dry powder as obtained from phase 1) of Example 2 was characterized by XRD. The XRD pattern was shown in FIG. 1, from which no diffraction peak of separate $Sb_2O_3$ was observed. It is believed that a composite oxide containing vanadium and antimony was formed, and thus release of the $Sb_2O_3$ into air during subsequent operations can be prevented effectively.

Figure 2:
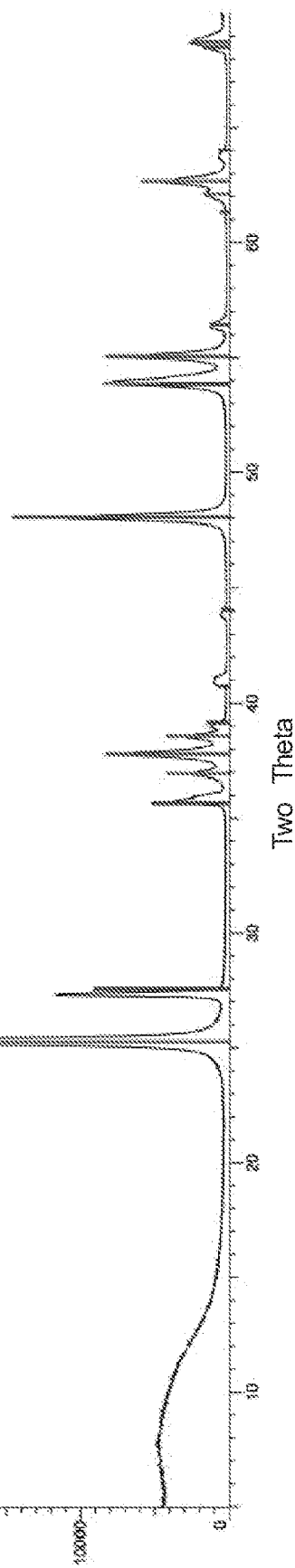
FIG. 2 shows an XRD pattern of the intermediate as prepared in phase 1) of Example 2 according to the present invention, which has been further calcined at 700° C.

The dry powder as obtained from phase 1) of Example 2 was further calcined at 700° C. in air for 1 hour and then characterized by XRD. The XRD pattern was shown in FIG. 2, from which two strong peaks at two theta of around 27.3° and 35.7° was observed. It is believed that a composite oxide of vanadium, antimony and titanium was formed.

Figure 3:
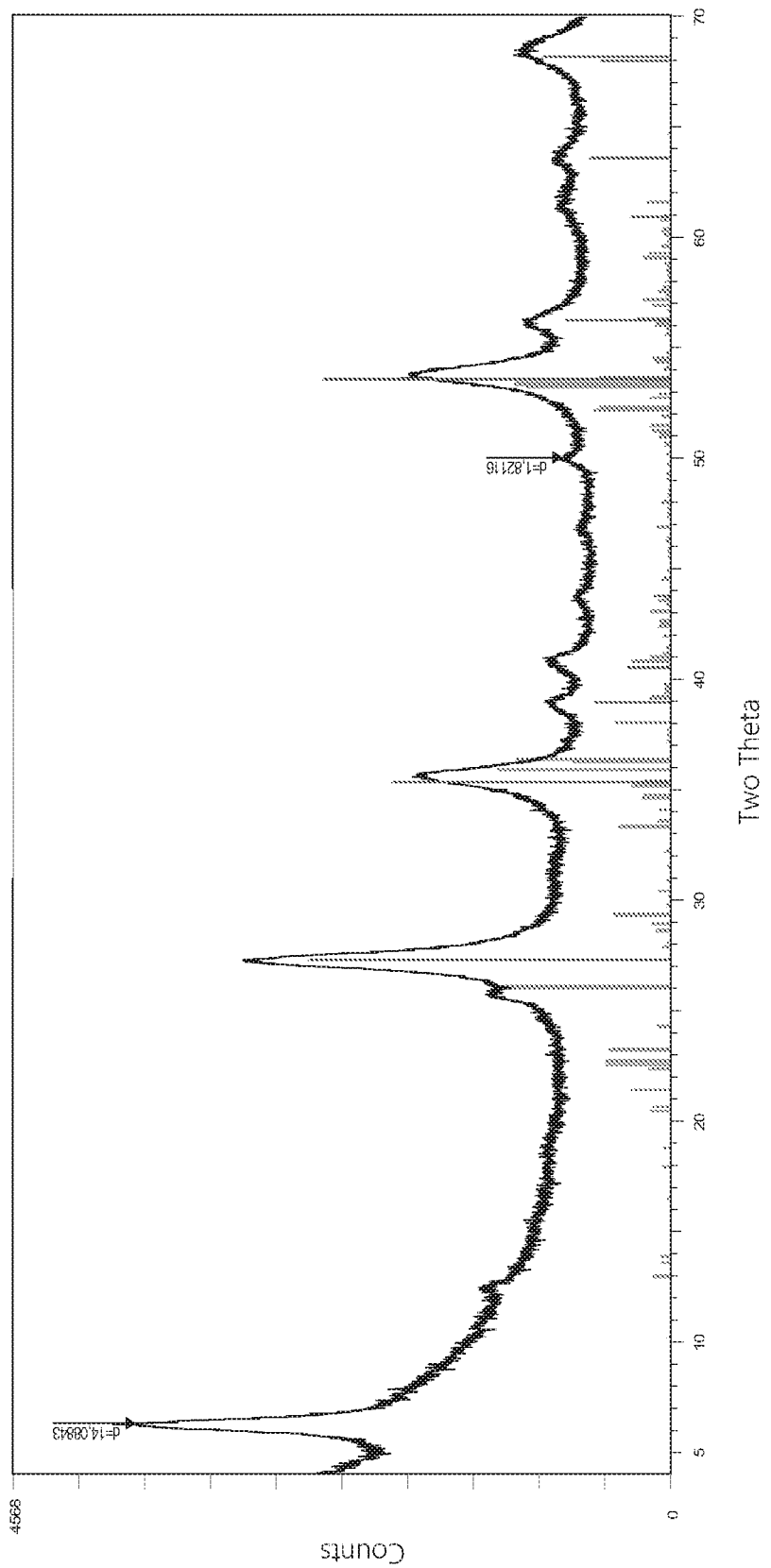
FIG. 3 shows an XRD pattern of an intermediate as prepared in phase 1) of Example 3.

The black powder as obtained from phase 1) of Example 3 was characterized by XRD. The XRD pattern was shown in FIG. 3, from which it can be confirmed that a composite oxide of vanadium and antimony was formed. The peak as indicated by the highest line between two theta of 35° and 36° is attributed to the composite oxide of vanadium and antimony.

SCR Performance Test of Catalysts from Examples 1 to 3

The catalysts from Examples 1 to 3 were tested for SCR performance at 200° C. and 500° C. All the catalysts were placed in the fixed bed lab simulator for testing. The feed gas consists of, by volume, 5% $H_2O$, 10% $O_2$, 500 ppm NO, 500 ppm $NH_3$ and a balance of $N_2$, and was supplied at a space velocity of 60,000 h$^{-1}$. The catalysts were tested for both performances at fresh state (as-prepared) and after aging at 550° C. for 100 hours in an atmosphere consisting of 90% air and 10% steam (v/v). The activity test results are summarized in Table 1.

The SCR performance was characterized by the conversion of NOx, which was calculated according to the equation:

$$\text{Conv. } NOx = (NOx_{inlet} - NOx_{outlet})/NOx_{inlet} \times 100\%$$

TABLE 1

| | Conv. NOx, % | | | |
| --- | --- | --- | --- | --- |
| | @ 200° C. | | @ 500° C. | |
| Example | as-prepared | after aging | as-prepared | after aging |
| 1 (Comparative) | 49.6 | 60 | 84.6 | 84 |
| 2 (Inventive) | 51 | 65 | 84.8 | 85 |

It can be seen from the results shown in Table 1, higher conversion of NOx at 200° C. was achieved with the antimony promoted vanadium catalyst of Example 2 at both fresh and aged states, particularly at aged state, than the conversion of NOx at 200° C. achieved with the catalyst of Example 1 having same catalyst composition, while comparable performances at 500° C. were achieved.

Furthermore, the production method of Example 2 includes a separate phase for forming a mixture comprising a $TiO_2$-based support and a composite oxide containing vanadium and antimony, without any substance with EHS risks being released into air directly.

The invention claimed is:

1. A method for producing antimony vanadium composite oxide catalysts, comprising:
   1) Providing a mixture comprising a $TiO_2$-based support and a composite oxide containing vanadium and antimony, wherein the mixture in step 1), is prepared by a process comprising sub-steps:
   1.1) preparing a mixture comprising a vanadium precursor, an antimony precursor, and the $TiO_2$-based support or a precursor thereof, optionally with a solvent;
   1.2) drying or heating the mixture at a temperature ranging from 80° C. to 250° C.; and
   1.3) calcining at a temperature ranging from 300° C. to 700° C. in an oxygen-containing atmosphere to obtain a mixture comprising a $TiO_2$-based support and a composite oxide containing vanadium and antimony;

2) preparing a slurry comprising the mixture obtained from step 1), an additive comprising a solvent and one or more species selected from the group consisting of Si, Al, Zr, Ti, W and Mo; and 3) applying the slurry onto a substrate or processing the slurry into shaped bodies.

2. The method according to claim 1, wherein the mixture in sub-step 1.1) is a wet mixture.

3. The method according to claim 2, wherein the wet mixture is prepared by adding a solution of vanadium precursor in the solvent to a mixture of $TiO_2$-based support and $Sb_2O_3$ via incipient wetness impregnation.

4. The method according to claim 1, wherein the drying or heating in sub-step 1.2) is at a temperature ranging from 100° C. to 250° C.

5. The method according to claim 1, wherein the calcining in sub-step 1.3) is at a temperature ranging from 350° C. to 700° C.

6. The method according to claim 1, wherein the $TiO_2$-based support comprises $TiO_2$ in a form of anatase.

7. The method according to claim 1, wherein the additive is selected from the group consisting of $SiO_2$, $ZrO_2$, $Al_2O_3$, $TiO_2$, $WO_3$ and $MoO_3$ and any precursors thereof.

8. The method according to claim 1 wherein no substance with EHS risks is released directly into the air in step 1.

9. The method according to claim 1, further comprising, after step 3),

4) Drying at a temperature ranging from 20° C. to 300° C.; and 5) calcining at a temperature of 350° C. or greater.

10. The method according to claim 9, wherein the drying or heating in step 4) is at a temperature ranging from 20° C. to 250° C.

11. The method according to claim 9, wherein the calcining in step 5) is at a temperature ranging from 350° C. to 700° C.

12. The method according to claim 1, wherein the slurry in step 3) is applied onto a substrate having a honeycomb structure, a ceramic honeycomb substrate, or a substrate shaped into a honeycomb body by extrusion.

13. The antimony vanadium composite oxide catalysts obtained by the method according to claim 1.

14. A method for selective catalytic reduction of nitrogen oxides in exhaust gases comprising contacting exhaust gases with the antimony vanadium composite oxide catalysts obtained by the method according to claim 1.

15. The method for selective catalytic reduction of nitrogen oxides according to claim 14, wherein exhaust gases are from an internal combustion engine selected from the group consisting of a diesel engine, a power plant, and an incinerator.

16. A method for selective catalytic reduction of nitrogen oxides present in exhaust gases from an internal combustion engine selected from the group consisting of a diesel engine, a power plant and an incinerator, comprising contacting the exhaust gases with the antimony vanadium composite oxide catalysts according to claim 13.

* * * * *